(12) United States Patent
Motohashi

(10) Patent No.: US 12,373,854 B2
(45) Date of Patent: Jul. 29, 2025

(54) VIDEO PROVIDING SYSTEM, VIDEO PROVIDING METHOD, AND COMPUTER PROGRAM

(71) Applicant: NEC Corporation, Tokyo (JP)

(72) Inventor: Yousuke Motohashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 330 days.

(21) Appl. No.: 18/012,437

(22) PCT Filed: Jun. 30, 2020

(86) PCT No.: PCT/JP2020/025673
§ 371 (c)(1),
(2) Date: Dec. 22, 2022

(87) PCT Pub. No.: WO2022/003826
PCT Pub. Date: Jan. 6, 2022

(65) Prior Publication Data
US 2023/0177538 A1 Jun. 8, 2023

(51) Int. Cl.
*G06Q 30/0202* (2023.01)
*G06Q 30/0601* (2023.01)

(52) U.S. Cl.
CPC ..... *G06Q 30/0202* (2013.01); *G06Q 30/0601* (2013.01)

(58) Field of Classification Search
CPC . G06Q 30/0601; G06Q 30/0202; G06Q 30/02
See application file for complete search history.

(56) References Cited

U.S. PATENT DOCUMENTS

| | | | |
|---|---|---|---|
| 6,389,168 B2 * | 5/2002 | Altunbasak | G06T 9/005 348/700 |
| 9,418,136 B1 * | 8/2016 | Gudmundsson | G06F 16/435 |
| 2003/0191659 A1 | 10/2003 | Okita et al. | |
| 2007/0141545 A1 * | 6/2007 | Tan | H04N 5/144 348/E5.065 |
| 2018/0012386 A1 * | 1/2018 | Kemelmaher | G06F 16/58 |
| 2018/0324472 A1 * | 11/2018 | Stern | H04N 21/2387 |
| 2019/0286654 A1 * | 9/2019 | Chiarandini | G06F 16/7867 |

(Continued)

FOREIGN PATENT DOCUMENTS

| | | |
|---|---|---|
| JP | H09-128401 A | 5/1997 |
| JP | 2003-296606 A | 10/2003 |
| JP | 2010-218181 A | 9/2010 |

(Continued)

OTHER PUBLICATIONS

International Search Report for PCT Application No. PCT/JP2020/025673, mailed on Sep. 29, 2020.

*Primary Examiner* — Etienne P Leroux
(74) *Attorney, Agent, or Firm* — Sughrue Mion, PLLC

(57) ABSTRACT

A video providing system includes: a search query acquisition unit that obtains a search query; a video search unit that searches for a video corresponding to the search query from among a plurality of videos; and a value setting unit that sets a value of the searched video on the basis of a similarity degree between the searched video and the search query. According to such a video providing system, it is possible to properly set the value of the video by using the similarity degree between the video and the search query.

11 Claims, 13 Drawing Sheets

(56) References Cited

U.S. PATENT DOCUMENTS

2020/0336802 A1* 10/2020 Russell ............ H04N 21/26603
2021/0337161 A1* 10/2021 Tsubaki ................. H04N 5/765

FOREIGN PATENT DOCUMENTS

| JP | 2011-039915 A | 2/2011 |
| JP | 2014-153977 A | 8/2014 |
| JP | 2019-168936 A | 10/2019 |
| WO | 2008/120678 A1 | 10/2008 |
| WO | 2012/176385 A1 | 12/2012 |

* cited by examiner

VIDEO PROVIDING SYSTEM, VIDEO PROVIDING METHOD, AND COMPUTER PROGRAM

This application is a National Stage Entry of PCT/JP2020/025673 filed on Jun. 30, 2020, the contents of all of which are incorporated herein by reference, in their entirety.

TECHNICAL FIELD

The present invention relates to a video providing system, a video providing method, and a computer program that provide a video or picture.

BACKGROUND ART

A known system of this type provides video content in response to a user's request. For example, Patent Literature 1 discloses a technique/technology of searching for and providing the content that is requested from a content user and of collecting a content use charge from the content user and paying a content provider.

As another related technique/technology, Patent Literature 2 discloses a technique/technology of searching for and presenting a video or picture corresponding to a highlight scene included in a digest video. Patent Literature 3 discloses a technique/technology of providing moving image content with a summary tag for understanding its contents to use it to search for a video scene. Patent Literature 4 discloses a technique/technology of displaying a preview moving image of content before the purchase of the content.

CITATION LIST

Patent Literature

Patent Literature 1: JP2003-296606A
Patent Literature 2: JP2011-039915A
Patent Literature 3: JP2014-153977A
Patent Literature 4: JP2019-168936A

SUMMARY

Technical Problem

When an attempt is made to provide a video for a fee, it is required to analyze the value of the video and set an appropriate price. In each of the Patent Literatures described above, however, discussion on a method of setting the price is insufficient, and there is room for improvement.

The present invention has been made in view of the above problems, and it is an example object of the present invention to provide a video providing system, a video providing method, and a computer program that are configured to properly set a price when a video is provided.

Solution to Problem

A video providing system according to an example aspect of the present invention includes: a search query acquisition unit that obtains a search query; a video search unit that searches for a video corresponding to the search query from among a plurality of videos; and a value setting unit that sets a value of the searched video on the basis of a similarity degree between the searched video and the search query.

A video providing system according to another example aspect of the present invention includes: a search query acquisition unit that obtains a search query; a video search unit that searches for a video corresponding to the search query from among a plurality of videos; a scarcity acquisition unit that obtains scarcity of the searched video; and a value setting unit that sets a value of the searched video on the basis of the scarcity of the searched video.

A video providing method according to an example aspect of the present invention includes: obtaining a search query; searching for a video corresponding to the search query from among a plurality of videos; and setting a value of the searched video on the basis of a similarity degree between the searched video and the search query.

A video providing method according to another example aspect of the present invention includes: obtaining a search query; searching for a video corresponding to the search query from among a plurality of videos; obtaining scarcity of the searched video; and setting a value of the searched video on the basis of the scarcity of the searched video.

A computer program according to an example aspect of the present invention operates a computer: to obtain a search query; to search for a video corresponding to the search query from among a plurality of videos; and to set a value of the searched video on the basis of a similarity degree between the searched video and the search query.

A computer program according to another example aspect of the present invention operates a computer: to obtain a search query; to search for a video corresponding to the search query from among a plurality of videos; to obtain scarcity of the searched video; and to set a value of the searched video on the basis of the scarcity of the searched video.

Effect of the Invention

According to the video providing system, the video providing method, and computer program, it is possible to properly set the value of a video or picture.

DESCRIPTION OF EXAMPLE EMBODIMENTS

Hereinafter, a video providing system, a video providing method, and a computer program according to example embodiments will be described with reference to the drawings.

First Example Embodiment

First, a video providing system according to a first example embodiment will be described with reference to FIG. 1 to FIG. 3.
(Hardware Configuration)

Figure 1:
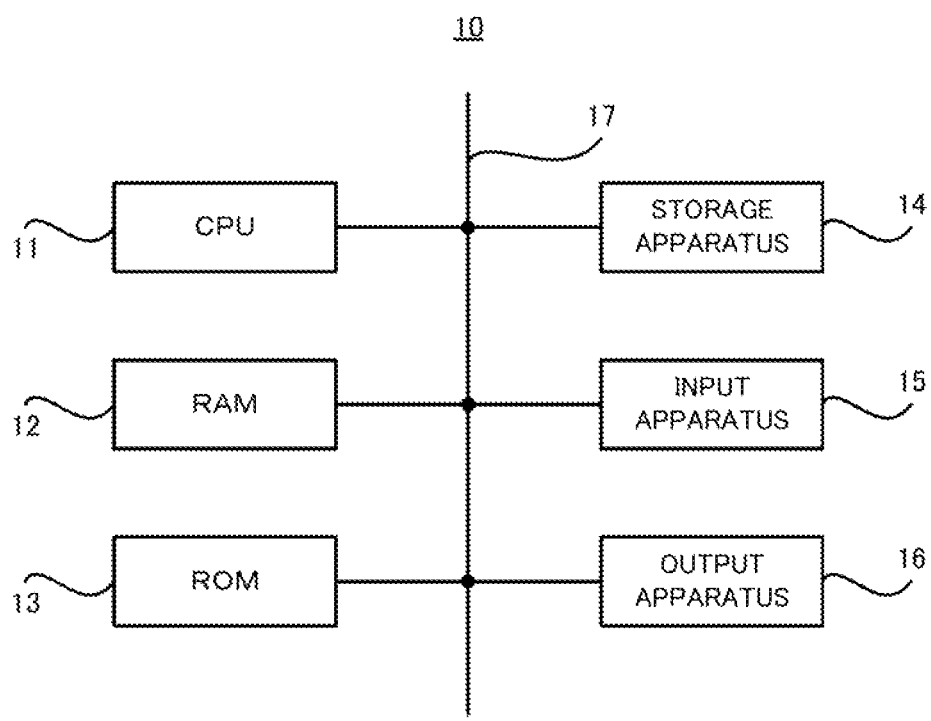
FIG. 1 is a block diagram illustrating a hardware configuration of a video providing system according to a first example embodiment.

With reference to FIG. 1, a hardware configuration of the video providing system according to the first example embodiment will be described. FIG. 1 is a block diagram illustrating the hardware configuration of the video providing system according to the first example embodiment.

As illustrated in FIG. 1, a video providing system 10 according to the first example embodiment includes a CPU (Central Processing Unit) 11, a RAM (Random Access Memory) 12, a ROM (Read Only Memory) 13, and a storage apparatus 14. The video providing system 10 may also include an input apparatus 15 and an output apparatus 16. The CPU 11, the RAM 12, the ROM 13, the storage apparatus 14, the input apparatus 15, and the output apparatus 16 are connected through a data bus 17.

The CPU 11 reads a computer program. For example, the CPU 11 is configured to read a computer program stored by at least one of the RAM 12, the ROM 13 and the storage apparatus 14. Alternatively, the CPU 11 may read a computer program stored by a computer readable recording medium by using a not-illustrated recording medium reading apparatus. The CPU 11 may obtain (i.e., read) a computer program from a not-illustrated apparatus that is located outside the video providing system 10 through a network interface. The CPU 11 controls the RAM 12, the storage apparatus 14, the input apparatus 15, and the output apparatus 16 by executing the read computer program. Especially in the example embodiment, when the CPU 11 executes the read computer program, a function block for setting the value of a video or picture is realized or implemented in the CPU 11.

The RAM 12 temporarily stores the computer program to be executed by the CPU 11. The RAM 12 temporarily stores the data that is temporarily used by the CPU 11 when the CPU 11 executes the computer program. The RAM 12 may be, for example, a D-RAM (Dynamic RAM).

The ROM 13 stores the computer program to be executed by the CPU 11. The ROM 13 may otherwise store fixed data. The ROM 13 may be, for example, a P-ROM (Programmable ROM).

The storage apparatus 14 stores the data that is stored for a long term by the video providing system 10. The storage apparatus 14 may operate as a temporary storage apparatus of the CPU 11. The storage apparatus 14 may include, for example, at least one of a hard disk apparatus, a magneto-optical disk apparatus, an SSD (Solid State Drive), and a disk array apparatus.

The input apparatus 15 is an apparatus that receives an input instruction from a user of the video providing system 10. The input apparatus 15 may include, for example, at least one of a keyboard, a mouse, and a touch panel.

The output apparatus 16 is an apparatus that outputs information about the video providing system 10 to the outside.

For example, the output apparatus 16 may be a display apparatus (e.g., a display) that is configured to display the information about the video providing system 10.
(Functional Configuration)

Next, a functional configuration of the video providing system 10 according to the first example embodiment will be described with reference to FIG. 2. FIG. 2 is a block diagram illustrating the functional block of the video providing system according to the first example embodiment.

Figure 2:
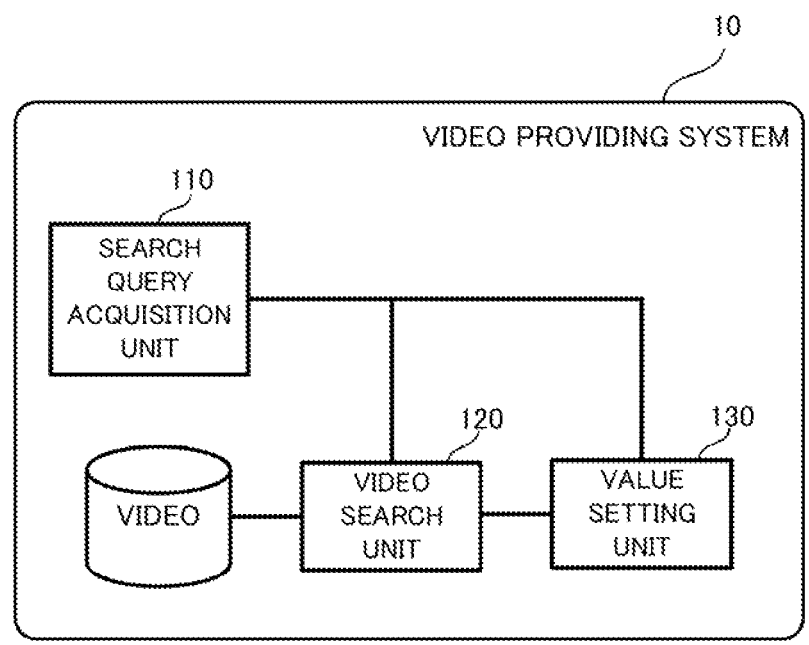
FIG. 2 is a block diagram illustrating a functional block provided by the video providing system according to the first example embodiment.

As illustrated in FIG. 2, the video providing system 10 according to the first example embodiment is configured to search for a desired video (specifically, a video corresponding to a search query inputted by the user) from accumulated videos, and is configured to set the value of the searched video. The video may be accumulated, for example, in the storage apparatus 14 (see FIG. 1) or the like, or may be accumulated in a storage unit external to the system (e.g., a server, etc.). The video providing system 10 includes, as functional blocks for realizing its function, a search query acquisition unit 110, a video search unit 120, and a value setting unit 130. These functional blocks are realized or implemented, for example, in the CPU 11 (see FIG. 1).

The search query acquisition unit 110 is configured to search for the search query inputted by the user. The search query includes information about the video desired by the user (i.e., the video that the user wishes to purchase). The search query is inputted, for example, as a natural language. The search query in this case may include, for example, multiple words or phrases. An example of the search query that is the natural language includes "a sandwich that I ate while using a computer," "a distillation still that I visited," and "lunch that I had in Hokkaido", or the like. The user may input the search query, for example, by using the input apparatus 15 (see FIG. 1, etc.). The search query obtained by the search query acquisition unit 110 is configured to be outputted to each of the video search unit 120 and the value setting unit 130.

The video search unit 120 is configured to search for the video corresponding to the search query obtained by the search query acquisition unit 110. from the accumulated videos. A search result of the video search unit 120 may include a plurality of videos. Although there is no particular limitation on a method of searching for the video corresponding to the search query, the search may be performed by using a similarity degree used for price setting described later (specifically, a similarity degree between the video and the search query). Information about the video searched for by the video search unit 120 is configured to be outputted to the value setting unit 130.

The value setting unit 130 is configured to set the value of the video searched for by the video search unit 120. Specifically, the value setting unit 130 sets the value of the video on the basis of the similarity degree between the video and the search query. The value of the video may include, for example, a price when the video is provided. The following exemplifies that the value setting unit 130 sets the price when the video is provided. For example, when the similarity degree is high between the video and the search query, the value setting unit 130 may set a high price of the video. On the other hand, when the similarity degree is low between the video and the search query, the value setting unit 130 may set a low price of the video. Here, the "similarity degree" is a quantitative parameter indicating an extent of similarity between an object tag and the search query. When there are a plurality of searched videos, the value setting unit 130 sets a price for each of the videos. In this case, the same price may be set for the plurality of videos, or a different price may be set for each video. The price set for the video is typically outputted to a video user (i.e., the user who has inputted the search query) along with the search result of the video.

The value setting unit 130 may set the price by correcting a standard price set for the video, in accordance with the similarity degree. For example, when the search result includes a video for which the standard price is set to 100 yen, the value setting unit 130 may set the price by multiplying the standard price by a correction factor corresponding to the similarity degree. More specifically, when the similarity degree is high between the searched video and the search query, the value setting unit 130 multiplies the standard price of 100 yen by a correction factor of 1.5 and sets the price to 150 yen. Alternatively, when the similarity degree is low between the searched video and the search query, the value setting unit 130 multiplies the standard price of 100 yen by a correction factor of 0.8 and sets the price to 80 yen.

In the purchase of the searched video at the set price, the value setting unit 130 may vary the price of the video. For example, the value setting unit 130 may increase the price by multiplying the standard price of the purchased video by a predetermined magnification. More specifically, when a video with a standard price of 100 yen is purchased, the value setting unit 130 multiplies the original standard price of 100 yen by a predetermined magnification of 1.1 and resets the standard price at 110 yen. When this video is included in the subsequent search result, the value setting unit 130 may set the price by multiplying the newly set standard price by the correction factor corresponding to the similarity degree. Such standard price resetting may be performed every time the video is purchased. In other words, as the video is purchased more often, the standard price may be further increased. In this case, a predetermined upper limit may be set for the standard price.

Although it is not illustrated here, the video providing system 10 may have a function of collecting from the video user a charge for the video (i.e., the amount of money corresponding to the price set by the value setting unit 130) and a function of paying the collected charge to a video provider (i.e., a person who has a right to the video). Furthermore, on condition that the price of the video is paid, the video providing system 10 may have a function of outputting the video (in other words, making it available) to the video user.

(Description of Operation)

Next, a flow of operation of the video providing system 10 according to the first example embodiment will be described with reference to FIG. 3. FIG. 3 is a flowchart illustrating the flow of the operation of the video providing system according to the first example embodiment.

Figure 3:
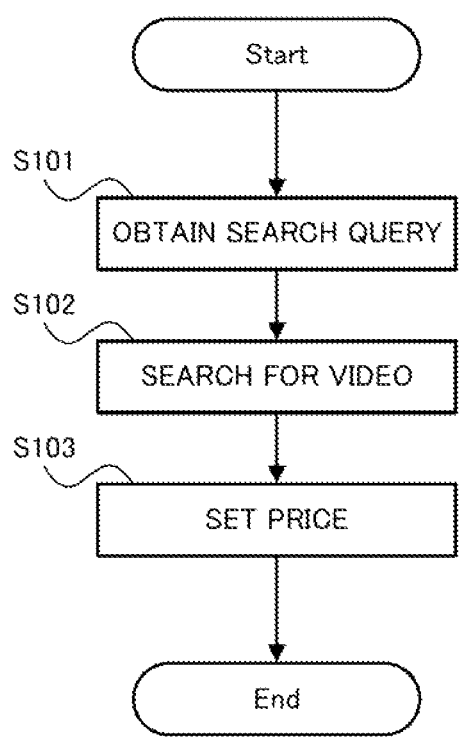
FIG. 3 is a flowchart illustrating a flow of operation of the video providing system according to the first example embodiment.

As illustrated in FIG. 3, in operation of the video providing system 10 according to the first example embodiment, first, the search query acquisition unit 110 obtains the search query inputted by the user (step S101). Then, the video search unit 120 searches for the video corresponding to the obtained search query (step S102).

Subsequently, the value setting unit 130 sets the price of the searched video (step S103). Specifically, the value setting unit 130 calculates the similarity degree between the video and the search query, and sets the price of the video on the basis of the calculated similarity degree. When the similarity degree between the video and the search query is used in the search performed by the video search unit 120, the similarity degree may not be calculated again, and the price may be set on the basis of the similarity used in the search.

(Technical Effect)

Next, a technical effect obtained by the video providing system 10 according to the first example embodiment will be described.

As described in FIG. 1 to FIG. 3, in the video providing system 10 according to the first example embodiment, the price of the video is set on the basis of the similarity degree between the video and the search query. Therefore, it is possible to properly set the price when the video is provided (i.e., the value of the video). For example, when the similarity degree is high between the video and the search query (in other words, the video to be provided is extremely close to a video required by the video user), it is considered that the video user will purchase the video even if a higher price is set. On the other hand, even when the similarity degree is low between the video and the search query (in other words, the video to be provided is somewhat different from the video required by the video user), it is possible to increase the video user's desire to purchase by setting a lower price.

The video providing system 10 according to the first example embodiment may be applied, for example, to a video information bank, and it is effective especially when the video is provided for an enterprise. For example, when an enterprise is looking for a video to be used for marketing, if there is a video close to the search query, the video may be purchased even in relatively expensive price setting. In such a situation, if the price can be set in accordance with the similarity degree with the search query, the video provider may be able to receive a proper value for the provision of the video.

Second Example Embodiment

Next, the video providing system 10 according to a second example embodiment will be described with reference to FIG. 4 to FIG. 6. The second example embodiment is partially different from the first example embodiment described above only in the configuration and operation, and is substantially the same in the other parts. Therefore, the parts that differ from those of the first example embodiment will be described in detail below, and the other overlapping parts will not be described.

(Functional Configuration)

First, a functional configuration of the video providing system 10 according to the second example embodiment will be described with reference to FIG. 4. FIG. 4 is a block diagram illustrating the functional block provided by the video providing system according to the second example embodiment. In FIG. 4, the same components as those illustrated in FIG. 2 carry the same reference numerals.

Figure 4:
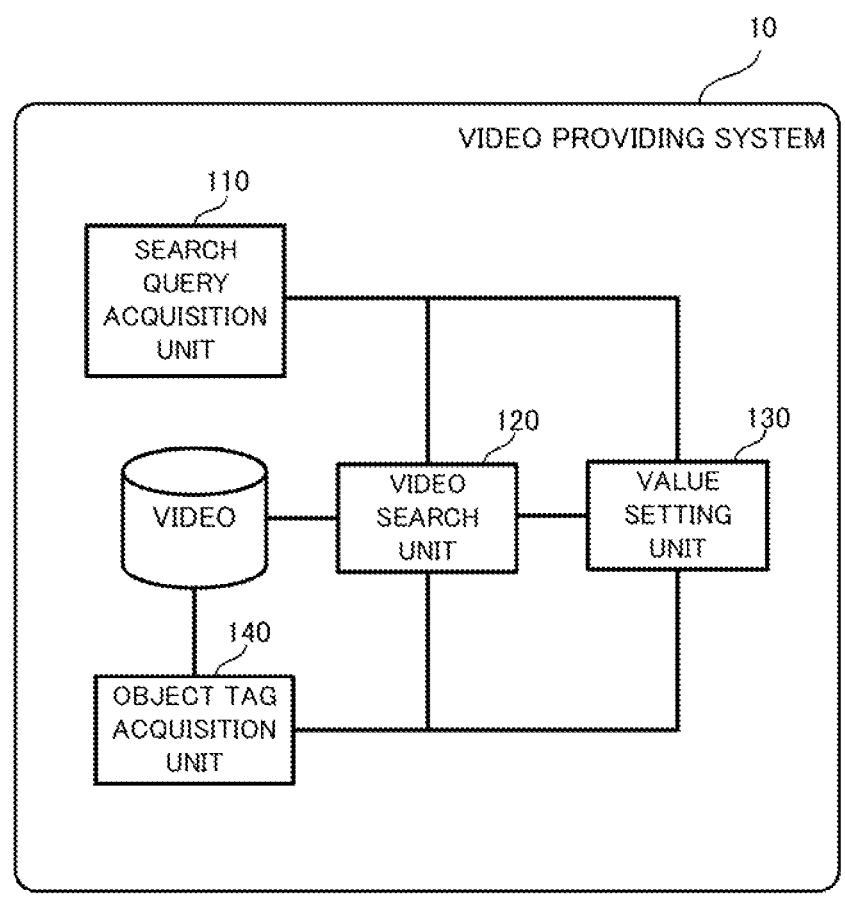
FIG. 4 is a block diagram illustrating a functional block provided by a video providing system according to a second example embodiment.

As illustrated in FIG. 4, the video providing system 10 according to the second example embodiment includes the search query acquisition unit 110, the video search unit 120, the value setting unit 130, and an object tag acquisition unit 140. That is, the video providing system 10 according to the second example embodiment further includes the object tag acquisition unit 140 in addition to the configuration in the first example embodiment (see FIG. 2).

The object tag acquisition unit 140 is configured to obtain an object tag from the accumulated videos. The object tag is information about an object that appears in a video and is associated with each object in the video. A plurality of object tags may be associated with one object. The object tag is typically a common noun, but may be associated with a proper noun, for example, by performing an identity test or the like. That is, the object tag may include a unique identification information for individually distinguishing objects. The object tag may also be information indicating information (e.g., a shape, a character, etc.) other than the name of the object. The object tag obtained by the object tag acquisition unit 140 is configured to be outputted to the video search unit 120 and the value setting unit 130.

(Operation)

Next, a flow of operation of the video providing system 10 according to the second example embodiment will be described with reference to FIG. 5. FIG. 5 is a flowchart illustrating the flow of the operation of the video providing system according to the second example embodiment. In FIG. 5, the same steps as those illustrated in FIG. 3 carry the same reference numerals.

Figure 5:
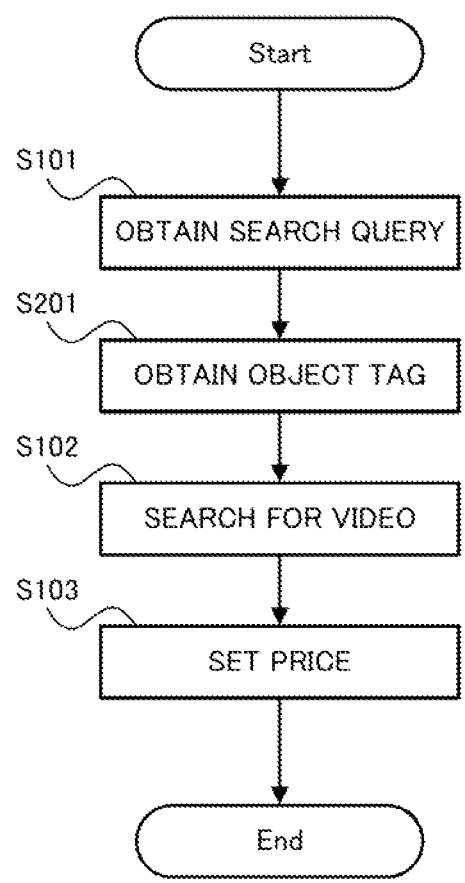
FIG. 5 is a flowchart illustrating a flow of operation of the video providing system according to the second example embodiment.

As illustrated in FIG. 5, in operation of the video providing system 10 according to the second example embodiment, first, the search query acquisition unit 110 obtains the search query inputted by the user (the step S101). In addition, the object tag acquisition unit 140 obtains the object tag from the accumulated videos (i.e., the videos to be searched (step S201). Then, the video search unit 120 searches for the video corresponding to the obtained search query (the step S102).

Subsequently, the value setting unit 130 sets the price of the searched video (the step S103). Here, in particular, the value setting unit 130 obtains the similarity degree between the video and the search query by using the object tag. Specifically, the value setting unit 130 compares the object tag and the search query, to thereby calculate the similarity degree between the video and the search query. The value setting unit 130 may set the price of the video on the basis of the similarity degree obtained by using the object tag as described above. The similarity degree between the object tag and the search query may be used for the video search in the step S102.

Modified Example

Next, a modified example of the video providing system 10 according to the second example embodiment will be described with reference to FIG. 6. FIG. 6 is a block diagram illustrating the modified example of the video providing system according to the second example embodiment. In FIG. 6, the same components as those illustrated in FIG. 4 carry the same reference numerals.

Figure 6:
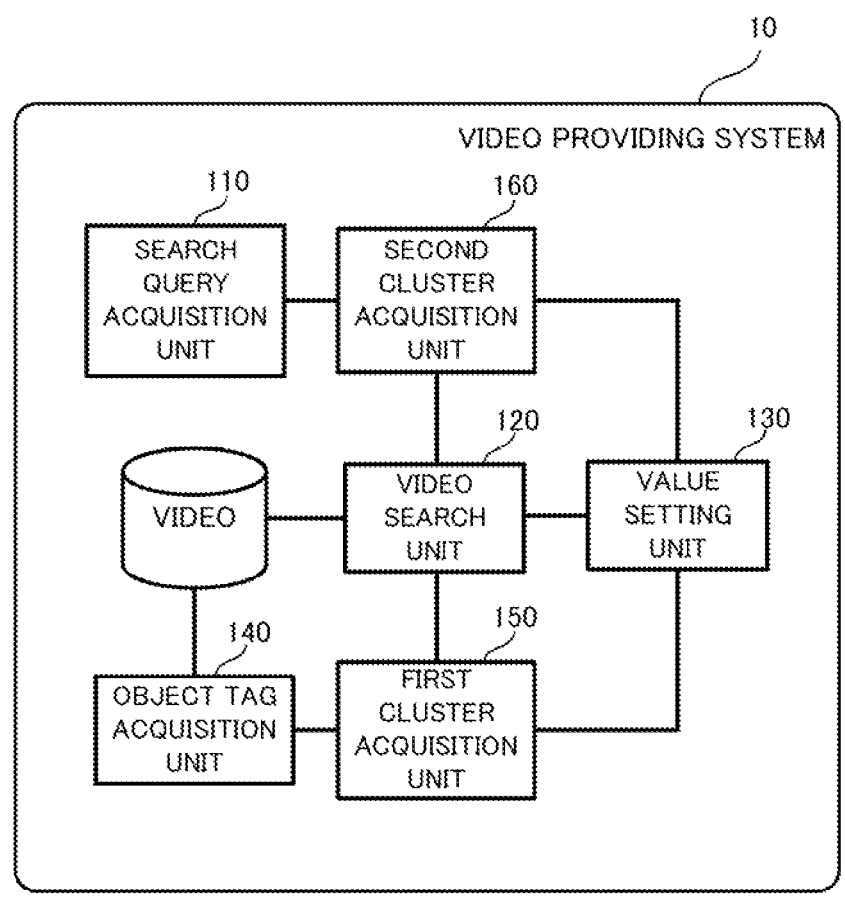
FIG. 6 is a block diagram illustrating a modified example of the video providing system according to the second example embodiment.

As illustrated in FIG. 6, the video providing system 10 according to the modified example of the second example embodiment includes the search query acquisition unit 110, the video search unit 120, the value setting unit 130, the object tag acquisition unit 140, a first cluster acquisition unit 150, and a second cluster acquisition unit 160. That is, the video providing system 10 according to the modified example of the second example embodiment further includes the first cluster acquisition unit 150 and the second cluster acquisition unit 160 in addition to the configuration in the second example embodiment described above (see FIG. 4).

The first cluster acquisition unit 150 is configured to perform clustering by using information included in the object tag obtained by the object tag acquisition unit 140, and to obtain a cluster to which the information included in the object tag belongs (hereinafter referred to as a "first cluster" as appropriate). The information included in the object tag includes, but is not limited to, a word included in the object tag. Although a clustering method is not particularly limited, it is possible to use k-means as a clustering algorithm as an example. Information about the first cluster obtained by the first cluster acquisition unit 150 is configured to be outputted to the video search unit 120 and the value setting unit 130.

The second cluster acquisition unit 160 is configured to perform clustering by using information included in the search query obtained by the search query 110 (typically, a word included in the search query), and to obtain a cluster to which the information included in the search query belongs (hereinafter referred to as a "second cluster" as appropriate). As for a specific clustering method, the same method as that of the first cluster acquisition unit 150 may be adopted, or a different method may be adopted. Information about the second cluster obtained by the second cluster acquisition unit 160 is configured to be outputted to the video search unit 120 and the value setting unit 130.

Here, in particular, the video providing system 10 according to the modified example of the second example embodiment compares the first cluster and the second cluster, to thereby calculate the similarity degree between the video and the search query. As described above, when the similarity degree is calculated by using the object tag, the object tag and the search query may not be directly compared, and the similarity degree may be calculated after the clustering. In this way, it is possible to more properly calculate the similarity degree between the video and the search query. The similarity degree calculated after the clustering can be used not only for the price setting by the value setting unit 130 but also for the video search by the video search unit 120.

(Technical Effect)

Next, a technical effect obtained by the video providing system 10 according to the second example embodiment will be described.

As described in FIG. 4 to FIG. 6, in the video providing system 10 according to the second example embodiment, the similarity degree is obtained by using the object tag. In this way, the similarity degree between the video and the search query can be obtained more properly. In the second example embodiment, especially, for example, even when the search query is inputted as the natural language, it is possible to properly calculate the similarity degree between the video and the search query. As a result, it is possible to more properly set the price (i.e., the value of the video) when the video is provided.

Third Example Embodiment

Next, the video providing system 10 according to a third example embodiment will be described with reference to FIG. 7 to FIG. 9. The third example embodiment is partially different from the first and second example embodiments described above only in the configuration and operation, and is substantially the same in the other parts. Therefore, the parts that differ from those of the first and second example embodiments will be described in detail below, and the other overlapping parts will not be described.

(Functional Configuration)

First, a functional configuration of the video providing system 10 according to the third example embodiment will be described with reference to FIG. 7. FIG. 7 is a block diagram illustrating the functional block provided by the video providing system according to the third example embodiment. In FIG. 7, the same components as those illustrated in FIG. 2 carry the same reference numerals.

Figure 7:
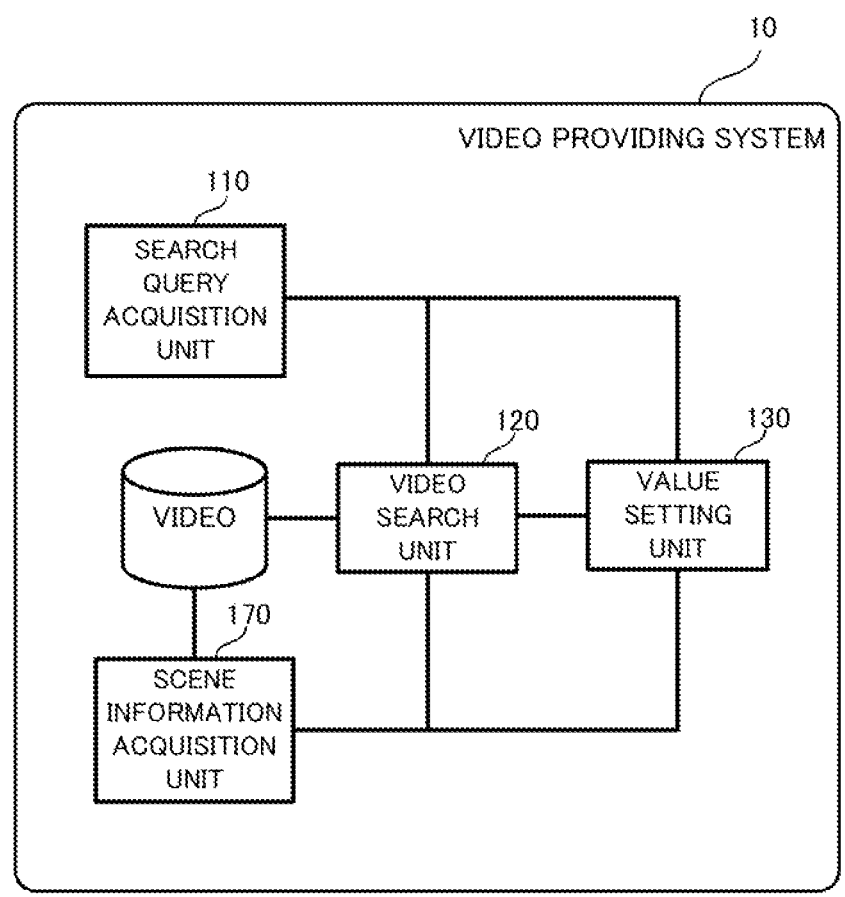
FIG. 7 is a block diagram illustrating a functional block provided by a video providing system according to a third example embodiment.

As illustrated in FIG. 7, the video providing system 10 according to the third example embodiment includes the search query acquisition unit 110, the video search unit 120, the value setting unit 130, and a scene information acquisition unit 170. That is, the video providing system 10 according to the third example embodiment further includes the scene information acquisition unit 170 in addition to the configuration in the first example embodiment (see FIG. 2).

The scene information acquisition unit 170 is configured to obtain a scene information indicating a scene of a video. The scene information includes, for example, a position information about a location where the video is recorded, a time information, information indicating a situation and an atmosphere or the like when the video is recorded, or the like. The scene information may include another information that may be related to the scene of the video. As a more specific example of the scene information, the position information is information obtained, for example, from a GPS (Global Positioning System) or the like. The time information is information about a date and time obtained from a time stamp, or the like. Furthermore, the information indicating the situation and the atmosphere or the like when the video is recorded may include information obtained from an action of a recorder or a recorded person. One scene information may be added to one video. For a video in which the scene is switched, a plurality of scene informations may be added to one video. A plurality of scene informations may be added to a certain period of video. For example, the time information obtained from the time stamp and the position information obtained from the GPS may be given to a certain period of video, as new information. The scene information obtained by the scene information acquisition unit 170 is configured to be outputted to the video search unit 120 and the value setting unit 130.

(Explanation of Operation)

Next, a flow of operation of the video providing system 10 according to the third example embodiment will be described with reference to FIG. 8. FIG. 8 is a flowchart illustrating the flow of the operation of the video providing system according to the third example embodiment. In FIG. 8, the same steps as those illustrated in FIG. 3 carry the same reference numerals.

Figure 8:
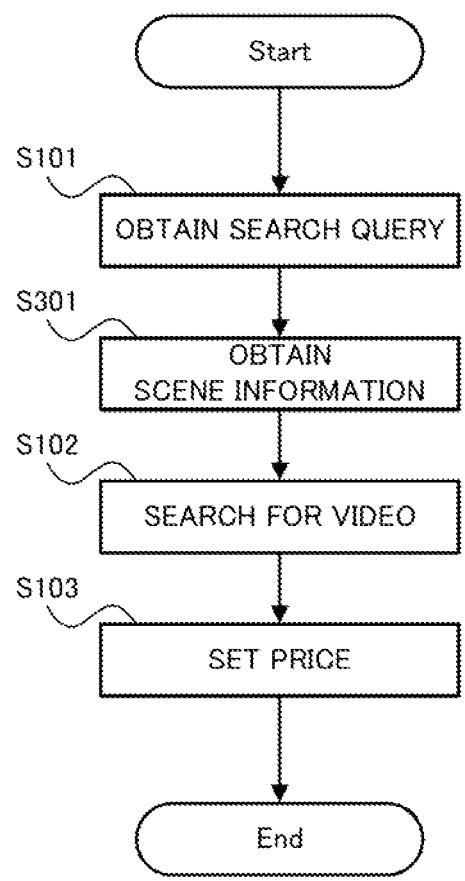
FIG. 8 is a flowchart illustrating a flow of operation of the video providing system according to the third example embodiment.

As illustrated in FIG. 8, in operation of the video providing system 10 according to the third example embodiment, first, the search query acquisition unit 110 obtains the search query inputted by the user (the step S101). In addition, the scene information acquisition unit 170 obtains the scene information from the accumulated videos (i.e., the videos to be searched) (step S301). Then, the video search unit 120 searches for the video corresponding to the obtained search query (the step S102).

Subsequently, the value setting unit 130 sets the price of the searched video (the step S103). Here, in particular, the value setting unit 130 obtains the similarity degree between the video and the search query by using the scene information. Specifically, the value setting unit 130 compares the scene information and the search query, to thereby calculate the similarity degree between the video and the search query. The value setting unit 130 may set the price of the video on the basis of the similarity degree obtained by using the scene information as described above. The similarity degree between the scene information and the search query may be used for the video search in the step S102.

Modified Example

Next, a modified example of the video providing system 10 according to the third example embodiment will be described with reference to FIG. 9. FIG. 9 is a block diagram illustrating the modified example of the video providing system according to the third example embodiment. In FIG. 9, the same components as those illustrated in FIG. 4, FIG. 6 and FIG. 7 *carry* the same reference numerals.

Figure 9:
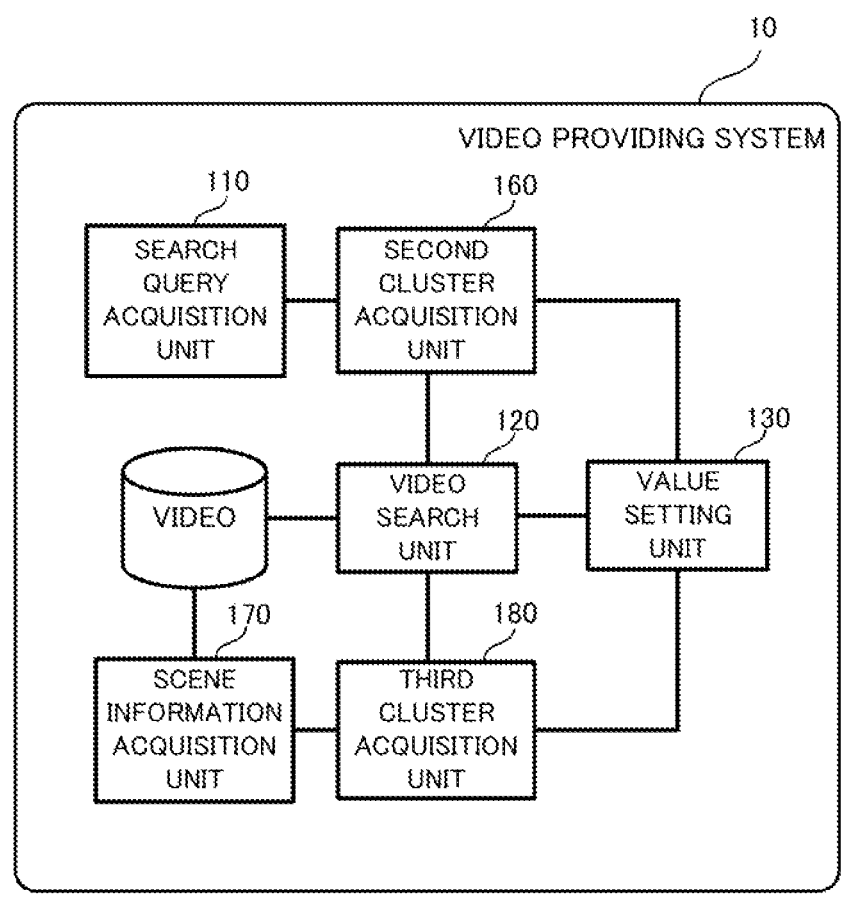
FIG. 9 is a block diagram illustrating a configuration of a modified example of the video providing system according to the third example embodiment.

As illustrated in FIG. 9, the video providing system 10 according to the modified example of the third example embodiment includes the search query acquisition unit 110, the video search unit 120, the value setting unit 130, the object tag acquisition unit 140, the second cluster acquisition unit 160, and a third cluster acquisition unit 180. That is, the video providing system 10 according to the modified example of the second example embodiment further includes the second cluster acquisition unit 160 and the third cluster acquisition unit 180 in addition to the configuration in the third example embodiment described above (see FIG. 7). The second cluster acquisition unit 160 is the same as that in the modified example of the second example embodiment (see FIG. 6).

The third cluster acquisition unit 180 is configured to perform clustering by using information included in the scene information obtained by the scene information acquisition unit 170 (typically, a word included in the scene information), and to obtain a cluster to which the information included in the scene information belongs (hereinafter referred to as a "third cluster" as appropriate). As for a specific clustering method, the same method as those of the first cluster acquisition unit 150 and the second cluster acquisition unit 160 may be adopted, or a different method may be adopted. Information about the third cluster obtained by the third cluster acquisition unit 180 is configured to be outputted to the video search unit 120 and the value setting unit 130.

Here, in particular, the video providing system 10 according to the modified example of the third example embodiment compares the second cluster and the third cluster, thereby calculate the similarity degree between the video and the search query. As described above, when the similarity degree is calculated by using the scene information, the scene information and the search query may not be directly compared, and the similarity degree may be calculated after the clustering. In this way, it is possible to more properly calculate the similarity degree between the video and the search query. The similarity degree calculated after the clustering can be used not only for the price setting by the value setting unit 130 but also for the video search by the video search unit 120.

(Technical Effect)

Next, a technical effect obtained by the video providing system 10 according to the third example embodiment will be described.

As described in FIG. 7 to FIG. 9, in the video providing system 10 according to the third example embodiment, the similarity degree is obtained by using the scene information. In this way, the similarity degree between the video and the search query can be obtained more properly. In the third example embodiment, as in the second example embodiment, for example, even when the search query is inputted as the natural language, it is possible to properly calculate the similarity degree between the video and the search query. As a result, it is possible to more properly set the price (i.e., the value of the video) when the video is provided.

The third example embodiment may also be combined with the second example embodiment. That is, the similarity degree between the video and the search query can be calculated by using both the object tag and the scene information. In this case, one similarity degree may be calculated by comparing the object tag with the similarity degree between the scene information and the search query. Alternatively, the similarity degree between the object tag and the search query and the similarity degree between the scene information and the search query may be calculated separately.

Fourth Example Embodiment

Next, the video providing system 10 according to a fourth example embodiment will be described with reference to FIG. 10 and FIG. 11. The fourth example embodiment is partially different from the first to third example embodiments described above only in the configuration and operation, and is substantially the same in the other parts. Therefore, the parts that differ from those of the first to third example embodiments will be described in detail below, and the other overlapping parts will not be described.
(Functional Configuration)

First, a functional configuration of the video providing system 10 according to the fourth example embodiment will be described with reference to FIG. 10. FIG. 10 is a block diagram illustrating a functional block provided by the video providing system according to the fourth example embodiment. In FIG. 10, the same components as those illustrated in FIG. 2 carry the same reference numerals.

Figure 10:
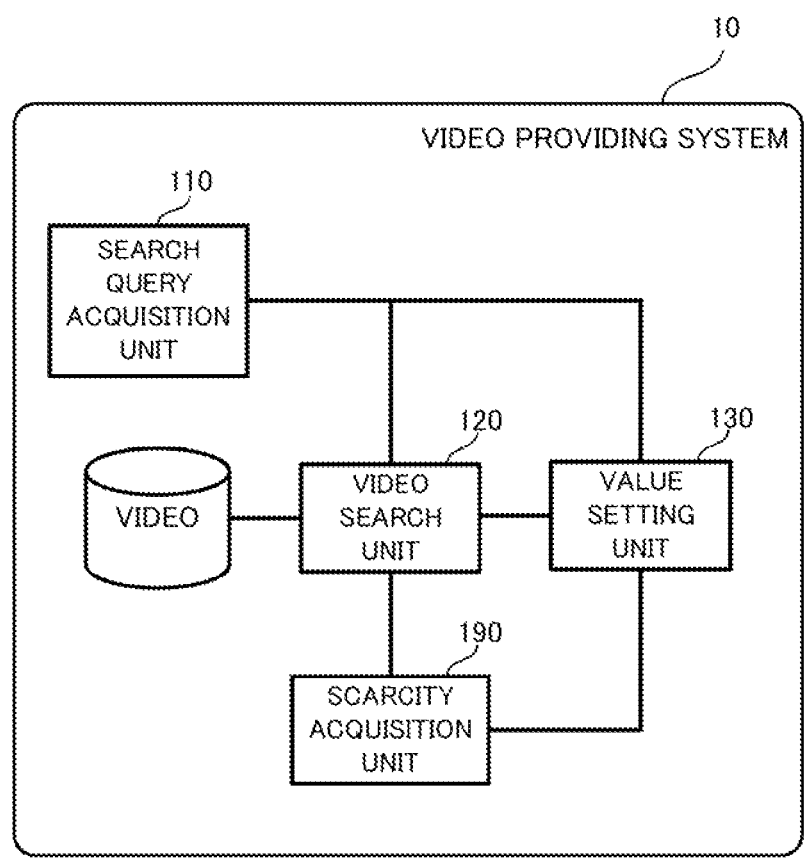
FIG. 10 is a block diagram illustrating a functional block provided by a video providing system according to a fourth example embodiment.

As illustrated in FIG. 10, the video providing system 10 according to the fourth example embodiment includes the search query acquisition unit 110, the video search unit 120, the value setting unit 130, and a scarcity acquisition unit 190. That is, the video providing system 10 according to the fourth example embodiment further includes the scarcity acquisition unit 190 in addition to the configuration in the first example embodiment (see FIG. 2). The video providing system 10 according to the fourth example embodiment may further include the scarcity acquisition unit 190 in addition to the configurations in the second and third example embodiments and the modified examples thereof (see FIG. 4, FIG. 6, FIG. 7, and FIG. 9)

The scarcity acquisition unit 190 is configured to obtain the scarcity of the video searched for by the video search unit 120. Here, the "scarcity" is a quantitative parameter indicating to what extent the video extracted as the search result is scarce (specifically, there are few similar videos). Information about the scarcity obtained by the scarcity acquisition unit 190 is configured to be outputted to the value setting unit 130.

Although a method of obtaining the scarcity is not particularly limited, the scarcity may be calculated, for example, on the basis of the number of videos in which the similarity degree with the search query is greater than or equal to a predetermined value. The "predetermined value" here is a threshold for determining whether or not the similarity degree between the video and the search query is sufficiently high. For example, when there is only one video in which the similarity degree with the search query is greater than or equal to the predetermined value, the scarcity of the video may be calculated as being extremely high. In addition, when there are only two or three videos in which the similarity degree with the search query is greater than or equal to the predetermined value, the scarcity of the videos may be calculated as being high. Furthermore, when there are four or more videos in which the similarity degree with the search query is greater than or equal to the predetermined value, the scarcity of the videos may be calculated as being low. Incidentally, the number of the videos described above is merely an example. The scarcity acquisition unit 190 may also obtain the scarcity by using an indicator that is different from the similarity degree and that may indicate the scarcity of the video.

The scarcity may not be calculated in the search as described above (in other words, by using the search result), but may be calculated in advance. When the scarcity is calculated in advance, for example, an object that appears in the video is tagged by image recognition, and the clustering is performed on the video on the basis of a linguistic similarity degree of the tag. When the cluster is large (i.e., many videos are included), the scarcity may be set low, and when the cluster is small (i.e., few videos are included), the scarcity may be set high.
(Description of Operation)

Next, a flow of operation of the video providing system 10 according to the fourth example embodiment will be described with reference to FIG. 11. FIG. 11 is a flowchart illustrating the flow of the operation of the video providing system according to the fourth example embodiment. In FIG. 11, the same steps as those illustrated in FIG. 3 carry the same reference numerals.

Figure 11:
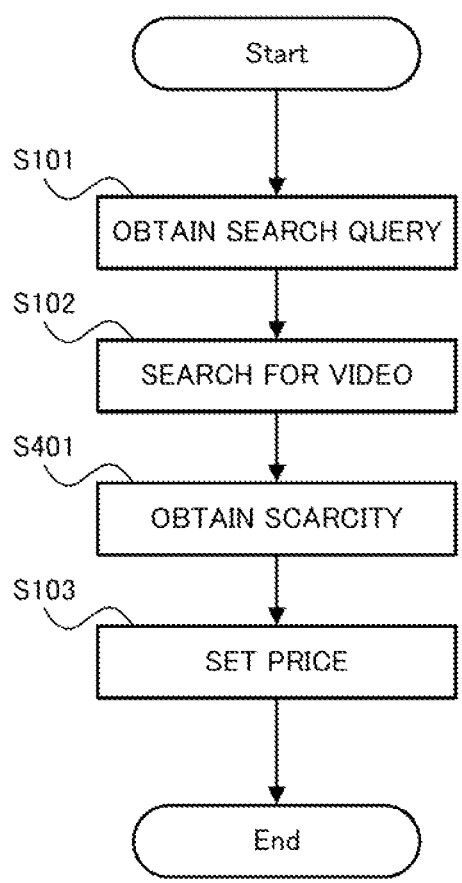
FIG. 11 is a flowchart illustrating a flow of operation of the video providing system according to the fourth example embodiment.

As illustrated in FIG. 11, in operation of the video providing system 10 according to the fourth example embodiment, first, the search query acquisition unit 110 obtains the search query inputted by the user (the step S101). Then, the video search unit 120 searches for the video corresponding to the obtained search query (the step S102).

The scarcity acquisition unit 190 then obtains the scarcity of the searched video (step S401). If there are a plurality of searched videos, the scarcity acquisition unit 190 may obtain the scarcity for each of the videos.

Subsequently, the value setting unit 130 sets the price of the searched video (the step S103). Here, the value setting unit 130 sets the price of the searched video by using the scarcity obtained by the scarcity acquisition unit 190 in addition to the similarity degree between the video and the search query. For example, the value setting unit 130 sets the price higher as the scarcity of the video is higher (i.e., there are not so many similar videos). More specifically, for those with high similarity degree but with low scarcity, the price may be set lower than that when the price is set only on the basis of the similarity degree. On the other hand, for those with low similarity but with high scarcity, the price may be set higher than that when the price is set only on the basis of the similarity. In addition, the price may be set by weighting each of the scarcity and the similarity degree. For example, an influence of the scarcity on the price may be increased relative to the similarity degree, or conversely, the influence of the similarity degree on the price may be increased relative to the scarcity.
(Technical Effect)

Next, a technical effect obtained by the video providing system 10 according to the fourth example embodiment will be described.

As described in FIG. 10 and FIG. 11, in the video providing system 10 according to the fourth example embodiment, the price of the video is set on the basis of the scarcity in addition to the similarity degree. In this way, it is possible to set the price of the video (i.e., the value of the video) more properly than that when only the similarity degree is used as in the first to third example embodiments.

Fifth Example Embodiment

Next, the video providing system 10 according to a fifth example embodiment will be described with reference to FIG. 12 and FIG. 13. The fifth example embodiment is partially different from the first to fourth example embodiments described above only in the configuration and operation, and is substantially the same in the other parts. Therefore, the parts that differ from those of the first to fourth example embodiments will be described in detail below, and the other overlapping parts will not be described.
(Functional Configuration)

First, a functional configuration of the video providing system 10 according to the fifth example embodiment will be described with reference to FIG. 12. FIG. 12 is a block diagram illustrating the functional block provided by the video providing system according to the fifth example embodiment. In FIG. 12, the same components as those illustrated in FIG. 10 carry the same reference numerals.

As illustrated in FIG. 10, the video providing system 10 according to the fourth example embodiment includes the search query acquisition unit 110, the video search unit 120, the value setting unit 130, and the scarcity acquisition unit 190. Although the video providing system 10 according to the fifth example embodiment is the same as the configuration in the fourth example embodiment (see FIG. 10) when only the components are viewed, the value setting unit 130 according to the fifth example embodiment uses a different method of setting the price from that in the fourth example embodiment.

Specifically, the value setting unit 130 according to the fifth example embodiment is configured to set the price of the searched video by using the scarcity obtained by the scarcity acquisition unit 190. That is, the value setting unit 130 according to the fifth example embodiment is configured to set the price of the searched video without using the similarity degree between the video and the search query. Therefore, the information about the search query used to calculate the similarity degree may not be inputted to the value setting unit 130 according to the fifth example embodiment.
(Description of Operation)

Next, a flow of operation of the video providing system 10 according to the fifth example embodiment will be described with reference to FIG. 13. FIG. 13 is a flowchart illustrating the flow of the operation of the video providing system according to the fifth example embodiment.

Figure 13:
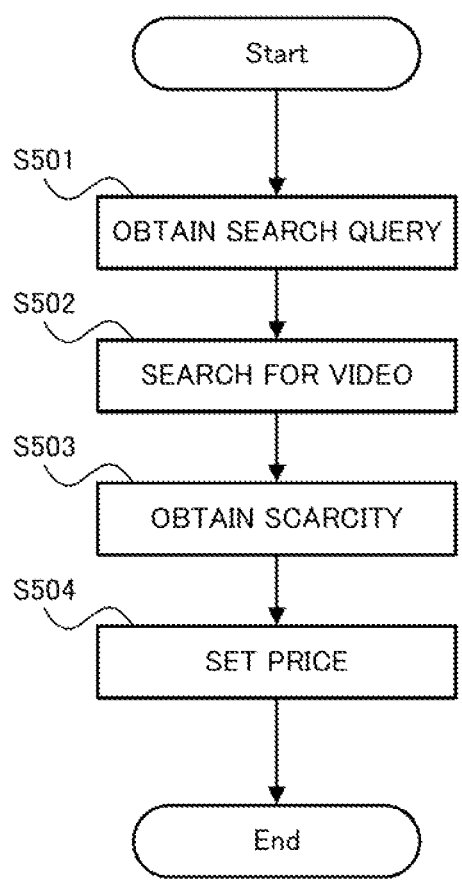
FIG. 13 is a flowchart illustrating a flow of operation of the video providing system according to the fifth example embodiment.

As illustrated in FIG. 13, in operation of the video providing system 10 according to the fifth example embodiment, first, the search query acquisition unit 110 obtains the search query inputted by the user (step S501). Then, the video search unit 120 searches for the video corresponding to the obtained search query (step S502).

The scarcity acquisition unit 190 then obtains the scarcity of the searched video (step S503). If there are a plurality of searched videos, the scarcity acquisition unit 190 may obtain the scarcity for each of the videos.

Subsequently, the value setting unit 130 sets the price of the searched video (step S504). Here, the value setting unit 130 sets the price of the searched video by using the scarcity obtained by the scarcity acquisition unit 190. For example, the value setting unit 130 sets the price higher as the scarcity of the video is higher (i.e., there are not so many similar videos).
(Technical Effect)

Next, a technical effect obtained by the video providing system 10 according to the fifth example embodiment will be described.

Figure 12:
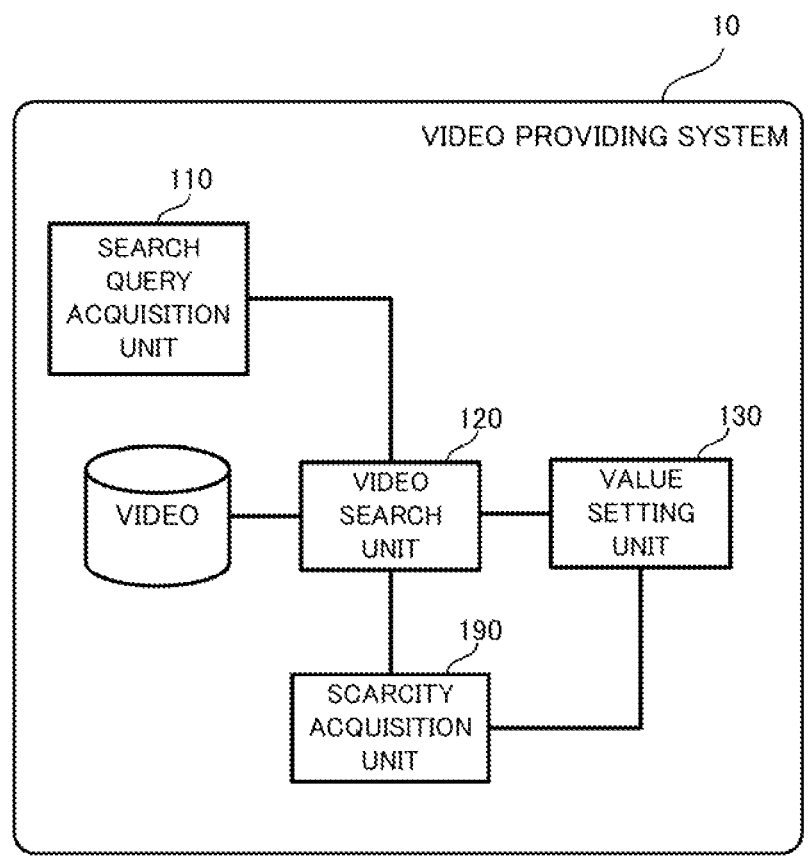
FIG. 12 is a block diagram illustrating a functional block provided by a video providing system according to a fifth example embodiment.

As described in FIG. 12 and FIG. 13, in the video providing system 10 according to the fifth example embodiment, the price of the video is set on the basis of the scarcity of the video. In this way, it is possible to properly set the price of the video (i.e., the value of the video) as in the case where the price is set by using the similarity degree, as in the first to fourth example embodiments. In the fifth example embodiment, unlike the fourth example embodiment, the similarity degree is not used, and it is thus possible to simplify a process of setting the price of the video. Therefore, it is possible to prevent a complicated system configuration and an increase in cost.

SUPPLEMENTARY NOTES

With respect to the example embodiments described above, the following Supplementary Notes will be described.
(Supplementary Note 1)

A video providing system described in Supplementary Note 1 is a video providing system including: a search query acquisition unit that obtains a search query; a video search unit that searches for a video corresponding to the search query from among a plurality of videos; and a value setting unit that sets a value of the searched video on the basis of a similarity degree between the searched video and the search query.
(Supplementary Note 2)

A video providing system described in Supplementary Note 2 is the video providing system described in Supplementary Note 1, further including an object tag acquisition unit that obtains an object tag associated with an object that appears in the video, wherein the value setting unit uses the object tag to obtain the similarity degree between the searched video and the similarity degree of the search query.
(Supplementary Note 3)

A video providing system described in Supplementary Note 3 is the video providing system described in Supplementary Note 2, further including: a first cluster acquisition unit that obtains a first cluster to which information included in the object tag belongs; and a second cluster acquisition unit that obtains a second cluster to which information included in the search query belongs, wherein the value setting unit compares the first cluster and the second cluster to obtain the similarity degree between the searched video and the similarity degree of the search query.
(Supplementary Note 4)

A video providing system described in Supplementary Note 4 is the video providing system described in any one of Supplementary Notes 1 to 3, further including a scene information acquisition unit that obtains a scene information indicating a scene of the video, wherein the value setting unit uses the scene information to obtain the similarity degree between the searched video and the similarity degree of the search query.
(Supplementary Note 5)

A video providing system described in Supplementary Note 5 is the video providing system described in Supplementary Note 4, further including: a third cluster acquisition unit that obtains a third cluster to which information included in the scene information belongs; and a second cluster acquisition unit that obtains a second cluster to which information included in the search query belongs, wherein the value setting unit compares the third cluster and the second cluster to obtain the similarity degree between the searched video and the similarity degree of the search query.
(Supplementary Note 6)

A video providing system described in Supplementary Note 6 is the video providing system described in any one of Supplementary Notes 1 to 5, further including a scarcity acquisition unit that obtains scarcity of the searched video, wherein the value setting unit sets the value of the searched video on the basis of the similarity degree between the searched video and the search query, and on the basis of the scarcity of the searched video.
(Supplementary Note 7)

A video providing system described in Supplementary Note 7 is the video providing system described in Supplementary Note 6, wherein the scarcity acquisition unit calculates the scarcity of the searched video on the basis of number of videos in which the similarity degree with the search query satisfies a predetermined condition.
(Supplementary Note 8)

A video providing system described in Supplementary Note 8 is the video providing system described in any one of Supplementary Notes 1 to 7, wherein the video search unit searches for the video corresponding to the search query on the basis of a similarity degree between each of the plurality of videos and the search query.
(Supplementary Note 9)

A video providing system described in Supplementary Note 9 is the video providing system described in any one of Supplementary Notes 1 to 8, wherein the value setting unit sets a price when the searched video is provided, as the value of the searched video.
(Supplementary Note 10)

A video providing system described in Supplementary Note 10 is the video provision system described in Supplementary Note 9, wherein the value setting unit resets the price when the searched video is provided, in purchase of the searched video.
(Supplementary Note 11)

A video providing system described in Supplementary Note 11 is the video providing system described in any one of Supplementary Notes 1 to 10, wherein the search query is a natural language.
(Supplementary Note 12)

A video providing system described in Supplementary Note 12 is a video providing system including: a search query acquisition unit that obtains a search query; a video search unit that searches for a video corresponding to the search query from among a plurality of videos; a scarcity acquisition unit that obtains scarcity of the searched video; and a value setting unit that sets a value of the searched video on the basis of the scarcity of the searched video.
(Supplementary Note 13)

A video providing method described in Supplementary Note 13 is a video providing method including: obtaining a search query; searching for a video corresponding to the search query from among a plurality of videos; and setting a value of the searched video on the basis of a similarity degree between the searched video and the search query.
(Supplementary Note 14)

A video providing method described in Supplementary Note 14 is a video providing method including: obtaining a search query; searching for a video corresponding to the search query from among a plurality of videos; obtaining scarcity of the searched video; and setting a value of the searched video on the basis of the scarcity of the searched video.
(Supplementary Note 15)

A computer program described in Supplementary Note 15 is a computer program that operates a computer: to obtain a search query; to search for a video corresponding to the search query from among a plurality of videos; and to set a value of the searched video on the basis of a similarity degree between the searched video and the search query.
(Supplementary Note 16)

A computer program described in Supplementary Note 16 is a computer program that operates a computer: to obtain a search query; to search for a video corresponding to the search query from among a plurality of videos; to obtain scarcity of the searched video; and to set a value of the searched video on the basis of the scarcity of the searched video.

This disclosure is not limited to the examples described above and is allowed to be changed, if desired, without departing from the essence or spirit of this disclosure which can be read from the claims and the entire specification. A video providing system, a video providing method, and a computer program with such modifications are also intended to be within the technical scope of this disclosure.

DESCRIPTION OF REFERENCE CODES

10 Video providing system
110 Search query acquisition unit
120 Video search unit
130 Value setting unit
140 Object tag acquisition unit
150 First cluster acquisition unit
160 Second cluster acquisition unit
170 Scene information acquisition unit
180 Third cluster acquisition unit
190 Scarcity acquisition unit

What is claimed is:

1. A video providing system comprising:
   at least one memory that is configured to store instructions; and
   at least one processor that is configured to execute the instructions to:
   obtain a search query;
   search for a video corresponding to the search query from among a plurality of videos;
   set a value of the searched video on the basis of a similarity degree between the searched video and the search query;
   obtain an object tag associated with an object that appears in the video;
   use the object tag to obtain the similarity degree between the searched video and the search query;
   obtain a first cluster to which information included in the object tag belongs;
   obtain a second cluster to which information included in the search query belongs; and
   compare the first cluster and the second cluster to obtain the similarity degree between the searched video and the search query.

2. The video providing system according to claim 1, further comprising executing the instructions to obtain a scene information indicating a scene of the video; and
   to use the scene information to obtain the similarity degree between the searched video and the search query.

3. The video providing system according to claim 2, further comprising executing the instructions to:
   obtain a third cluster to which information included in the scene information belongs;
   obtain a second cluster to which information included in the search query belongs; and
   compare the third cluster and the second cluster to obtain the similarity degree between the searched video and the search query.

4. The video providing system according to claim 1, further comprising executing the instructions to obtain scarcity of the searched video; and
   set the value of the searched video on the basis of the similarity degree between the searched video and the search query, and on the basis of the scarcity of the searched video.

5. The video providing system according to claim 4, further comprising executing the instructions to calculate the scarcity of the searched video on the basis of number of videos in which the similarity degree with the search query satisfies a predetermined condition.

6. The video providing system according to claim 1, further comprising executing the instructions to search for the video corresponding to the search query on the basis of a similarity degree between each of the plurality of videos and the search query.

7. The video providing system according to claim 1, further comprising executing the instructions to set a price when the searched video is provided, as the value of the searched video.

8. The video provision system according to claim 7, further comprising executing the instructions to reset the price when the searched video is provided, in purchase of the searched video.

9. The video providing system according to claim 1, wherein the search query is a natural language.

10. A video providing method comprising:
    obtaining a search query;
    searching for a video corresponding to the search query from among a plurality of videos;
    setting a value of the searched video on the basis of a similarity degree between the searched video and the search query;
    obtaining an object tag associated with an object that appears in the video;
    using the object tag to obtain the similarity degree between the searched video and the search query;
    obtaining a first cluster to which information included in the object tag belongs;
    obtaining a second cluster to which information included in the search query belongs; and
    comparing the first cluster and the second cluster to obtain the similarity degree between the searched video and the search query.

11. A non-transitory recording medium on which a computer program that allows a computer to execute a video providing method is recorded, the video providing method comprising:
    obtaining a search query;
    searching for a video corresponding to the search query from among a plurality of videos;
    setting a value of the searched video on the basis of a similarity degree between the searched video and the search query;
    obtaining an object tag associated with an object that appears in the video;
    using the object tag to obtain the similarity degree between the searched video and the search query;
    obtaining a first cluster to which information included in the object tag belongs;
    obtaining a second cluster to which information included in the search query belongs; and
    comparing the first cluster and the second cluster to obtain the similarity degree between the searched video and the search query.

\* \* \* \* \*